Figure 1:
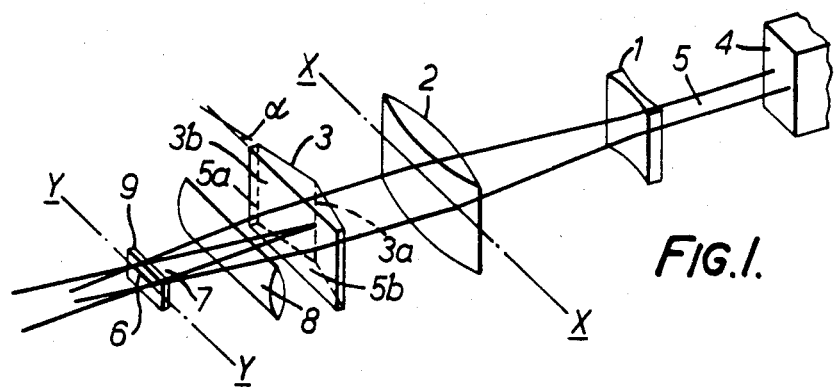

United States Patent [19]

Reid

[11] 4,149,773

[45] Apr. 17, 1979

[54] OPTICAL SYSTEM FOR THE PRODUCTION OF A BEAM OF LIGHT HAVING A UNIFORM INTENSITY DISTRIBUTION

[75] Inventor: Douglas C. J. Reid, St. James, England

[73] Assignee: Plessey Handel und Investments A.G., Zug, Switzerland

[21] Appl. No.: 751,703

[22] Filed: Dec. 17, 1976

[30] Foreign Application Priority Data

Dec. 23, 1975 [GB] United Kingdom .............. 52509/75

[51] Int. Cl.² ............................................. G02B 5/04
[52] U.S. Cl. .................................... 350/163; 350/170; 356/354
[58] Field of Search .............. 350/170, 169, 171, 163; 356/113, 170, 169, 171, 163, 111

[56] References Cited

U.S. PATENT DOCUMENTS 3,695,749  10/1972  Stapleton .......................... 350/163

OTHER PUBLICATIONS

Jenkins, F. A., and Harvey E. White; *Fundamentals of Optics;* McGraw-Hill, 3rd Edition, 1957, pp. 239-241.

*Primary Examiner*—Conrad J. Clark
*Attorney, Agent, or Firm*—Fleit & Jacobson

[57] ABSTRACT

This invention relates to an optical system for the production of a beam of light having a uniform intensity distribution. The optical system includes at least one Fresnel biprism for converting a beam of light having a non-uniform intensity distribution into a beam of light having a uniform intensity distribution.

8 Claims, 2 Drawing Figures

OPTICAL SYSTEM FOR THE PRODUCTION OF A BEAM OF LIGHT HAVING A UNIFORM INTENSITY DISTRIBUTION

This invention relates to an optical system for the production of a beam of light having a uniform intensity distribution.

Methods of producing a beam of light having a uniform intensity distribution for use in the illumination of an object are known, and include taking a photographic negative of the beam of light after its passage through the object, such as a PLZT modulator, then interposing between a light source and the object an optical system consisting of a positive cylindrical lens, i.e. a cylindrical lens having at least one convex surface, and the photographic negative has the effect of uniformly distributing the illumination by suppressing the Gaussian intensity distribution of the light emanating from the light source to produce light having a uniform intensity distribution known as a 'top hat' distribution. However, the main disadvantage of this method is that approximately 90% of the illumination is lost.

According to the invention there is provided an optical system for the production of a beam of light having a uniform intensity distribution which includes at least one Fresnel biprism for converting a beam of light having a non-uniform intensity distribution into a beam of light having a uniform intensity distribution.

According to a feature of the invention an optical system as described in the preceding paragraph is provided which includes a first optical means which is interposed between the faceted surface of the said at least one Fresnel biprism and an input of the optical system, and which is adapted to cause divergence and collimation of an input beam of light for application to the said faceted surface, the light output associated with each of the two facets of the faceted surface of the said at least one Fresnel biprism overlap and provide at the region of overlap a light beam of uniform intensity; and a second optical means which is interposed between that face of the said at least one Fresnel biprism from which the light output emanates and the said region of overlap and which has a focal length that determines the area over which the light output of the said at least one Fresnel biprism is uniformly distributed.

According to one another feature of the invention an optical system as described in the preceding paragraph is provided wherein the first optical means comprises a negative cylindrical lens and a positive cylindrical lens, the axes of the lenses and the edge intersection of the two facets of the said at least one Fresnel briprism being parallel; wherein the second optical means comprises a positive cylindrical lens whose axis is horizontal to the said edge intesection of the said at least one Fresnel biprism and wherein the first and second optical means act in conjunction with the said at least one Fresnel biprism to produce a line of light having a uniform intensity distribution at the said region of overlap.

According to a further feature of the invention an optical system as described in a preceding paragraph is provided wherein the first optical means comprises a negative spherical lens and a positive spherical lens; wherein the second optical means comprises a positive or negative spherical lens; wherein two Fresnal biprisms are provided and arranged so that the edge intersection of the two facets of each of the Fresnel biprisms are orthogonally related, so that the faceted surface of one of the Fresnel biprisms is adjacent to the positive spherical lens of the first optical means and so that the faceted surface of the other Fresnel biprism is adjacent to the second optical means; and wherein the said first and second optical means act in conjunction with the two Fresnel biprisms, to produce a square of light having a uniform intensity distribution at the region of overlap.

Figure 2:
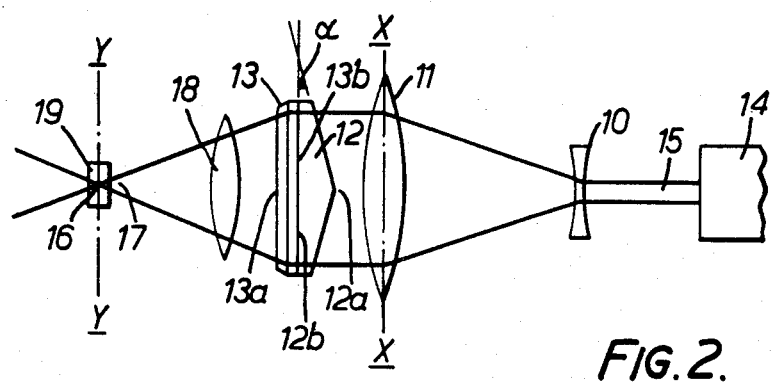

The foregoing and other features according to the invention will be better understood from the following description of preferred embodiments of the invention and with reference to the accompanying drawings in which:

FIG. 1 pictorially illustrates a preferred embodiment of an optical system according to the invention which is capable of producing a line of light having a uniform intensity distribution, and FIG. 2 diagrammatically illustrates in a cross-sectional side elevation another embodiment of the optical system according to the invention which is capable of producing a square of light having a uniform intensity distribution.

With reference to FIG. 1 of the drawings, a preferred embodiment of an optically system according to the invention which is capable of producing a line of light having a uniform intensity distribution, is illustrated therein and includes an optical arrangement that comprises a negative cylindrical lens 1 of focal length fl, i.e. a cylindrical lens having at least one concave surface, and a positive cylindrical lens 2 of focal length f2.

The cylindrical lenses 1 and 2 are interposed between a Fresnel biprism 3 and a light source 4, for example a laser operating in its fundamental mode. The beam of light 5 emitted by the light source 4 has a Gaussian intensity distribution i.e. a non-uniform intensity distribution, and is circular in cross-section.

The axes of the cylindrical lenses 1 and 2 are parallel to each other and to the edge intersection 3a of the two facets of the Fresnel biprism 3. The faceted surface of the Fresnel biprism 3 is, as is illustrated in FIG. 1 of the drawings, situated adjacent to the positive cylindrical lens 2 although if the angle $\alpha$ is less than 10° then the plane surface 3b of the Fresnel biprism 3 may be situated adjacent to the positive cylindrical lens 2.

The beam of light 5 emitted by the light source 4 passes first through the negative cylindrical lens 1 which causes divergence of the beam. The divergent beam of light then passes through the positive cylindrical lens 2 which causes collimation of the beam. Also, the cross-section of the beam of light 5 is changed by the positive cylindrical lens 2 from circular to elliptical.

A section taken along a line X—X through the elliptical portion of the beam at the cylindrical lens 2, shows a Gaussian intensity distribution. Thus an object interposed between the cylindrical lens 2, and the Fresnel biprism 3 whould be illuminated by a beam of light of elliptical cross-section having maximum illumination in the region of intersection of the major and minor axes of the ellipse.

The beam of light emanating from the cylindrical lens 2 then falls upon the faceted surface of the Fresnel biprism 3. The faceted surface of the Fresnel biprism 3 divides the plane wave front of the beam of light 5 into two halves 5a and 5b, each half having a non-uniform intensity distribution. The beams 5a and 5b are separately deviated through an angle which is determined by the geometry of the Fresnel biprism 3. The two beams 5a and 5b progressively merge until a line of light 6, having a uniform intensity distribution, is formed at a region of overlap 7 situated at a distance from the plane face 3b of the Fresnel biprism 3.

Interposed between the Fresnel biprism 3, and the region of overlap 7, is another optical arrangement 5 which includes a positive cylindrical lens 8 of focal length f3, positioned so that its axis is perpendicular to the edge intersection 3a of the Fresnal biprism 3.

The function of the cylindrical lens 8 is to optimise the area of illumination covered by the line of light 6, the actual area covered being dependent on the dimensions of an object 9 situated at the region of overlap 7.

A section taken along the line Y—Y drawn through the line of light 6 illuminating the object 9, shows a uniform intensity distribution known as a 'top hat' intensity distribution. This intensity distribution is formed by the superimposition of the two intensity distributions of the beams 5a and 5b which are each separate halves of the Gaussian intensity distribution of the beam of light 5. The flat portion of the 'top hat' intensity distribution i.e. that portion which is normal to its axis of symmetry, is made up from the superimposition of diffraction and interference fringes. The diffraction fringes are the product of the division of the plane wave front of the beam of light 5 at the faceted surface of the Fresnel biprism 3. The interference fringes are the product of the progressive merging and overlapping of the beams 5a and 5b. The superimposition of these two types of fringes causes an apparent deviation in the linearity of the flat portion of the 'top hat' intensity distribution. However, if the 'top hat' intensity distribution is sampled in order to form a histogram, using an aperture which is two or three times the size of the fringe separation, the apparent deviation in linearity caused by the superimposition of the diffraction and interference fringes will appear to only vary by $\pm 1.5\%$.

The line of light 6 is made up of a repeating pattern of fringes, the space between each fringe being dependent on the angle of the Fresnel biprism 3. The value of x is selected so as to provide, in the case of the object being a PLZT modulator, maximum illumination of the switching area of the modulator.

The length of the line of light 6 depends on the focal lengths f1, f2, f3 of the cylindrical lenses 1, 2 and 8.

With reference to FIG. 2 of the drawings, another embodiment of an optical system according to the invention is diagrammatically illustrated therein which produces a square of light having a uniform intensity distribution and which includes an optical arrangement that comprises a negative spherical lens 10 of focal length f4, and a positive spherical lens 11 of focal length f5.

The spherical lenses 10 and 11 are interposed between a pair of Fresnel biprisms 12 and 13 and a light source 14, for example a laser operating in its fundamental mode. The beam of light 15 has a Gaussian intensity distribution i.e. a non-uniform intensity distribution, and is circular in cross-section.

The negative spherical lens 10 is situated adjacent to the light source 14, and the positive spherical lens 11 is situated adjacent to the pair of Fresnel biprisms 12 and 13. The pair of Fresnel biprisms 12 and 13 are arranged so that the edge intersections 12a and 13a of the two facets of each of the faceted surfaces thereof are orthogonally related. The faceted surface of the Fresnel biprism 12 is adjacent to the positive spherical lens 11, and the plane surfaces 12b and 13b of each of the Fresnel biprisms face each other. The plane surfaces 12b and 13b are, in practice, in an abutting relationship when the angle $\alpha$ of each of the Fresnel biprisms are equal, but are spaced-apart when the angle $\alpha$ of each of the Fresnel biprisms are unequal.

The beam of light 15 emitted by the light source 14 passes first through the negative spherical lens 10 which causes divergence of the beam. The divergent beam of light then passes through the positive spherical lens 11 which causes collimation of the beam.

A section taken along a line X—X through the circular portion of the beam at the spherical lens 11, shows a Gaussian intensity distribution. Thus an object interposes between the spherical lens 11 and the pair of Fresnel biprisms 12 and 13 would be illuminated by a beam of light of circular cross-section having maximum illumination in the central region thereof.

The beam of light emanating from the positive lens 11 then falls upon the faceted surface of the Fresnel biprism 12. The faceted surface of the Fresnel biprism 12 divides the plane wave front of the beam of light 15 into two halves. Each half of the beam of light then passes through the plane surfaces 12b and 13b without further division. However, on passing through the faceted surface of the Fresnel biprism 13, the two halves of the beam of light are each divided into two. Thus, four beams of light each forming a separate quadrant of a square emanate from the facted surface of the Fresnel biprism 13 and progressively merge to form a square of light 16 having a uniform intensity distribution, at a region of overlap 17 situated at a distance from the faceted surface of the Fresnel biprism 13.

Interposed between the Fresnel biprism 13 and the region of overlap 17, is another optical arrangement which includes a positive or a negative spherical lens 18 of focal length f6.

The function of the spherical lens 18 is to optimise the area of illumination covered by the square of light 16, the actual area covered being dependent on the dimensions of and object 19 situated at the region of overlap 17. If, a small area of the object 19 requires to be illuminated a positive spherical lens is used, however, if a large area of the object 19 requires to be illuminated a negative spherical lens is used.

A section taken along the line Y—Y drawn through the square of light 16 illuminating the object 19, shows a uniform intensity distribution known as a 'top hat' intensity distribution. This intensity distribution is formed by the superimposition of the four intensity distributions of the four beams of light emanating from the faceted surface of the Fresnel biprisms 13. Each of the four beams possessing a separate portion of the Gaussian intensity distribution of the beam of light 15. The flat portion of the 'top hat' distribution is made up from the superimposition of diffraction and interference fringes. The diffraction fringes are the product of the division of the plane wave front of the beam of light 15 at the faceted surfaces of each of the Fresnel biprisms 12 and 13. The interference fringes are the product of the progressive merging and overlapping of the four beams of light emanating from the faceted surface of the Fresnel biprism 13. The superimposition of these two types of fringes causes an apparent deviation in the linearity of the flat portion of the 'top hat' intensity distribution. However, if the 'top hat' intensity distribution is sampled in order to form a two dimensional histogram, using a square aperture whose sides are two or three times the size of the fringe separation, the apparent deviation in the linearity caused by the superimposition of the diffraction fringes will appear to only vary by ±1.5%.

The dimensions of the square of light 16 are dependent on the focal lengths f4, f5 and f6 of the spherical lenses 10, 11 and 18.

The square of light 16 is made up of a rectilinear pattern of fringes, the space between each fringe being dependent on the angle α of the two Fresnel biprisms 12 and 13.

With the optical system according to FIG. 2 it should be noted that the positions of the Fresnel biprisms 12 and 13 may be reversed i.e. the Fresnel biprism 13 may be situated adjacent to the spherical lens 11 and, the Fresnel biprism 12 may be situated adjacent to the spherical lens 18.

A particular but not necessarily an exclusive application of the optical system according to the invention is in the uniform illumination of a linear modular array. The optical system can also be used in optical data processing and/or storage systems.

What we claim is:

1. For use with a laser producing a first beam of light having a Gaussian intensity distribution, an optical system for the production of a beam of light having a uniform intensity distribution, said system comprising; means for effecting a wavefront division of said first beam of light to produce second and third substantially equal beams of light, said second and said third beams of light each being of approximately 50% of the intensity of the first beam and each with a half Gaussian distribution, and means for recombining substantially the whole of said second and third beams of light to produce an area of light, said area being subdivided into strips, said strips being in a direction orthogonal to the direction of shearing, the width of each strip being greater than the distance between interference fringes produced by said recombination of said second and third beams of light, and the average intensity of light over any one of said strips being substantially equal to the average intensity of light over any other of said strips in said area.

2. An optical system as claimed in claim 1 wherein said means for effecting a wavefront division of said beam of light includes at least one Fresnal biprism having a faceted surface.

3. An optical system as claimed in claim 2 wherein the system includes a first optical means which is interposed between the faceted surface of the said at least one Fresnal biprism and said laser, and which is adapted to cause divergence and collimation of an input beam of light for application to the said faceted surface, the light output associated with each of the two facets of the faceted surface of the said at least one Fresnel biprism overlap and provide at the region of overlap a light beam of uniform intensity, and a second optical means which is interposed between the face of the said at least one Fresnel biprism from which the light output emanates and the said region of overlap and which has a focal length that determines the area over which the light output of the said at least one Fresnel biprism is uniformly distributed.

4. An optical system as claimed in claim 3 wherein the first optical means comprises a negative cylindrical lens and a positive cylindrical lens, the axes of the lenses and the edge intersection of the two facets of the said at least one Fresnel biprism being parallel; wherein the second optical means comprises a positive cylindrical lens whose axis is horizontal to the said edge intersection of the said at least one Fresnel biprism and wherein the first and second optical means act in conjunction with the said at least one Fresnel biprism to produce a line of light having a uniform intensity distribution at the said region of overlap.

5. An optical system as claimed in claim 4 wherein the length of the line of light produced is dependant upon the focal lengths of the lenses of the first and second optical means.

6. An optical system as claimed in claim 3 wherein the first optical means comprises a negative spherical lens and a positive spherical lens; wherein the second optical means comprises a positive or negative spherical lens; wherein two Fresnel biprisms are provided and arranged so that the edge intersections of the two facets of each of the Fresnel biprisms are orthogonally related, so that the faceted surface of one of the Fresnel biprisms is adjacent to the positive spherical lens of the first optical means and so that the faceted surface of the other Fresnel biprism is adjacent to the second optical means; and wherein the said first and second optical means act in conjunction with the two Fresnel biprisms, to produce a square of light having a uniform intensity distribution at the said region of overlap.

7. An optical system as claimed in claim 6 wherein the dimensions of the square of light produced are dependent upon the focal lengths of the lenses of the first and second optical means.

8. An optical system for the production of a beam of light having a uniform intensity distribution, said system comprising; a laser producing a first beam of light having a Gaussian intensity distribution means for effecting a wavefront division of said beam of light to produce second and third substantially equal beams of light said second and third beams of light each being of approximately 50% of the intensity of the first beam and each with a half Gaussian distribution, and means for recombining substantially the whole of said second and third beams of light to produce an area of light, said area being subdivided into strips, said strips being in a direction orthogonal to the direction of shearing, the width of each strip being greater than the distance between interference fringes produced by said recombination of said second and third beams of light, and the average intensity of light over any one of said strips being substantially equal to the average intensity of light over any other of said strips in said area.

* * * * *